April 24, 1962  M. WOOLDRIDGE  3,031,175
RIPPER MOUNTING FOR TWIN CRAWLERS
Filed April 10, 1958  2 Sheets-Sheet 2

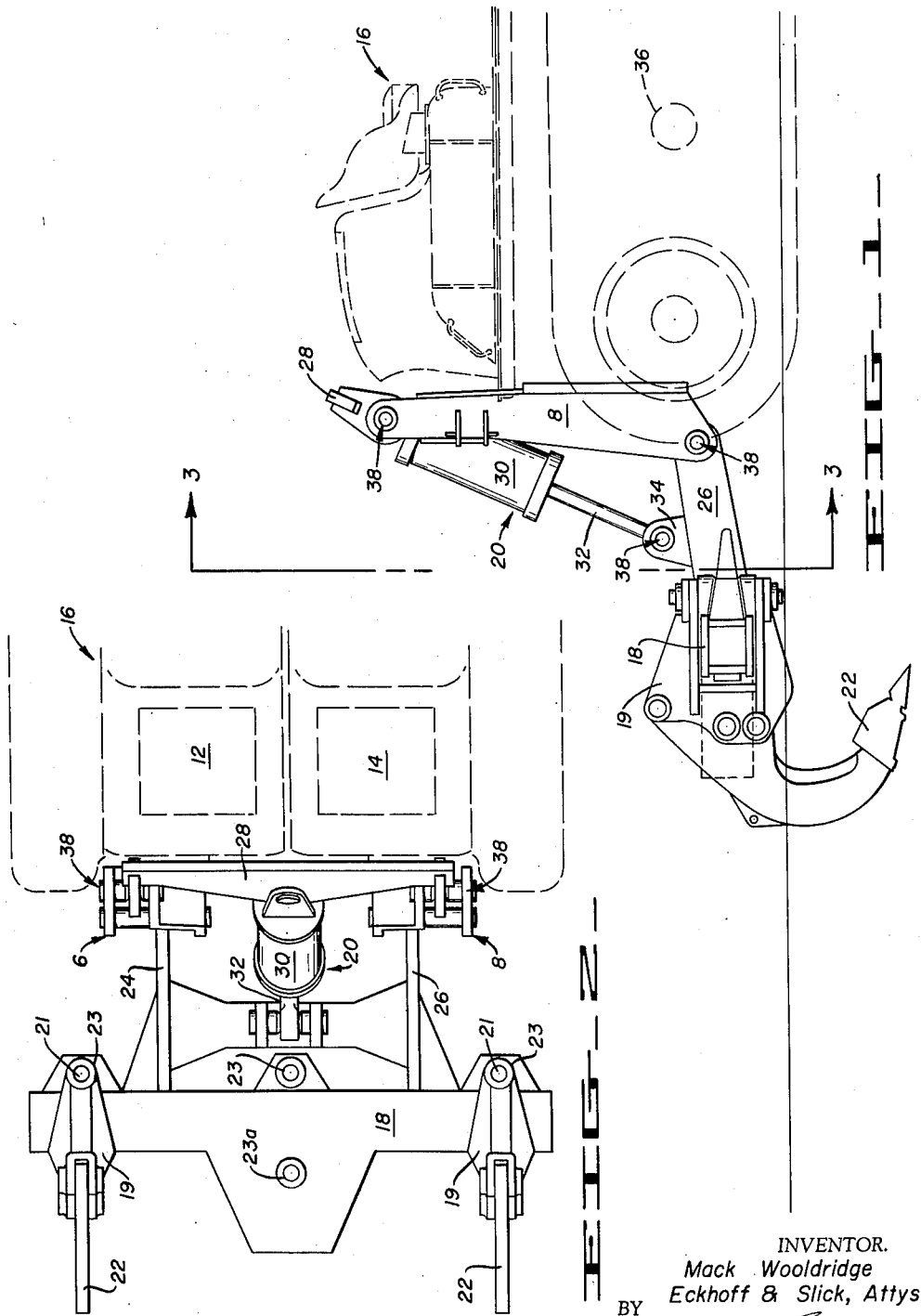

INVENTOR.
Mack Wooldridge
Eckhoff & Slick, Attys.
BY
A member of the firm.

United States Patent Office 3,031,175
Patented Apr. 24, 1962

3,031,175
RIPPER MOUNTING FOR TWIN CRAWLERS
Mack Wooldridge, 5943 Monzel, Oakland, Calif., assignor of one-half to Darrel M. Wooldridge, Oakland, Calif.
Filed Apr. 10, 1958, Ser. No. 727,743
2 Claims. (Cl. 262—8)

The invention relates to the mounting of tool beams such as are used with earth rippers upon tractors, and more particularly to mounting rippers on dual motor and track units known as twin crawlers.

The constant increase in size and power of tread laying tractors has culminated in the "twin crawler" rigs. These are comparable to a pair of tractors mounted side by side in Siamese twin relation. Separate body sections, each containing an engine and transmission, drive the tread on its own side of the unit. The body sections are connected by a single massive transverse shaft and each half of the tractor is free to oscillate about this shaft relative to the other half. Such oscillation creates problems in attaching earth working tools to the unit.

Connection of tools, such as earth rippers, to only one body section of the twin crawler is impractical because of strain on the transverse shaft. Therefore, a mount which will connect the tool beam to both sections must be used. But the relative movement of the body sections precludes the use of conventional mounting means. The present invention is concerned with a mounting attachment which will automatically compensate for the relative movement of the body sections in such manner that each section does its share of work and the tool beam and tools thereon are presented in their most efficient relation to the tractor unit.

A principal object of the present invention, therefore, is to provide a tool beam mount for twin crawlers which will instantly and automatically compensate for the position of the body sections of the tractor and thus reduce wear and strain on both the mounting means and the tractor.

Another object of the present invention is to provide a ripper attachment for twin crawler tractors which imposes equal load on the two halves of the unit at all times and under all conditions of use.

A further object of the invention is the provision of a universal bearing construction for a mount of the character above which will accommodate rotating, twisting or cocking, and axial motion of the associated parts.

A still further object of the present invention is the provision of a universal bearing construction of the type described which is self-aligning, self-cleaning, and which will stand up under the heavy duty use encountered in earth moving.

Another object of the invention is to provide a tool beam mount for twin crawlers which is simple, sturdy and trouble-free, and which may be easily attached to and removed from the tractor unit.

Other objects and features of advantage will become apparent from the following description and claims and from the drawings forming a part of this application.

In the drawings:

FIGURE 1 is a side elevational view of the tool beam mount of the present invention in operative association with a twin crawler tractor. The tractor has been partially broken away and is shown in phantom lines for clarity.

FIGURE 2 is a plan view of the subject matter of FIGURE 1.

Figure 3:
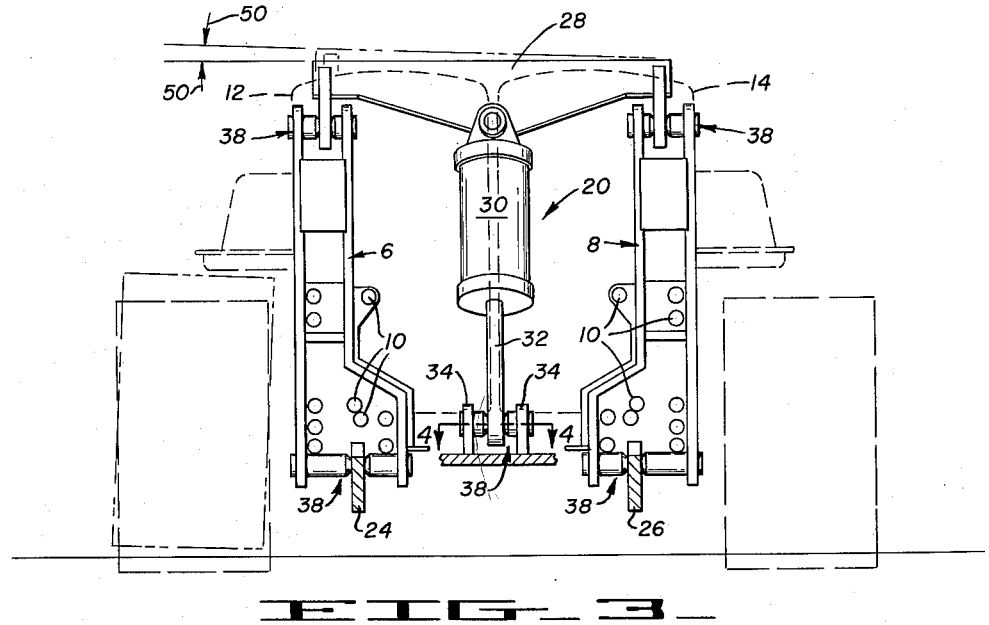
FIGURE 3 is a view of the rear end of the twin crawler and mount and is taken substantially on the plane of line 3—3 of FIGURE 1.

The tool beam mount of the present invention consists basically of a pair of brackets 6 and 8 adapted for attachment as by bolts 10 to the two body sections 12 and 14 of a twin crawler tractor 16, the brackets being formed to support a tool beam 18 and power means 20 for raising and lowering the tool beam. As illustrated in the drawings, the tool beam 18 carries earth working tools such as ripper teeth 22 which are swung to the position shown in FIGURE 1 when in use, and which are raised from the ground when not in use. Raising and lowering is effected by supporting the tool beam 18 on forwardly extending arms 24 and 26 which are in turn provided with a pivotal connection to the lower ends of brackets 6 and 8 respectively. The ripper teeth 22 are supported in brackets 19 which are pivoted on vertical pins 21 engaged through bearings 23 secured to tool beam 18. The central section of tool beam 18 extends rearwardly and provides a bearing 23a in which the pin 21 of a center ripper (not shown) may be engaged. A larger and deeper shanked ripper may be pivoted through the center bearing 23 when deeper ripping is desired.

Extending between the upper ends of the brackets 6 and 8 is a transverse member 28 pivotally supporting the upper end of a hydraulically actuated cylinder 30 providing the power means 20. The distal end of the piston rod 32 is pivotally connected to the tool beam 18 through ears 34, so that retraction of the rod into the cylinder will raise the tool beam and ripper teeth.

Because of the dual nature of the twin crawler unit, the body sections 12 and 14 may rock about the transverse connecting shaft (located approximately at 36 in FIGURE 1 of the drawings). This rocking action will cause not only a relative vertical displacement of the rear ends of the body sections to which the brackets 6 and 8 are attached, but also will cause a relative tilting of the brackets which will move the upper and lower pivotal connections forwardly or rearwardly as the case may be. Thus, relative oscillation of tractor body sections would tend to rack and distort a mount having ordinary pillow block bearings at the pivotal connections.

In accordance with the present invention, the pivotal connections of the brackets 6 and 8 to the tool beam arms 24 and 26, the pivotal connections of the brackets 6 and 8 to the cylinder supporting member 28, and the pivotal connection of the piston rod 32 to the tool beam ears 34 are provided in the form of a universal bearing 38 which will permit rotating, twisting and lateral motion. By reason of these bearings, the structure of the mount will automatically accommodate itself to relative movement of the body sections 12 and 14 of the tractor without racking or distortion and consequent strain and wear on the mount and tractor.

Figure 4:
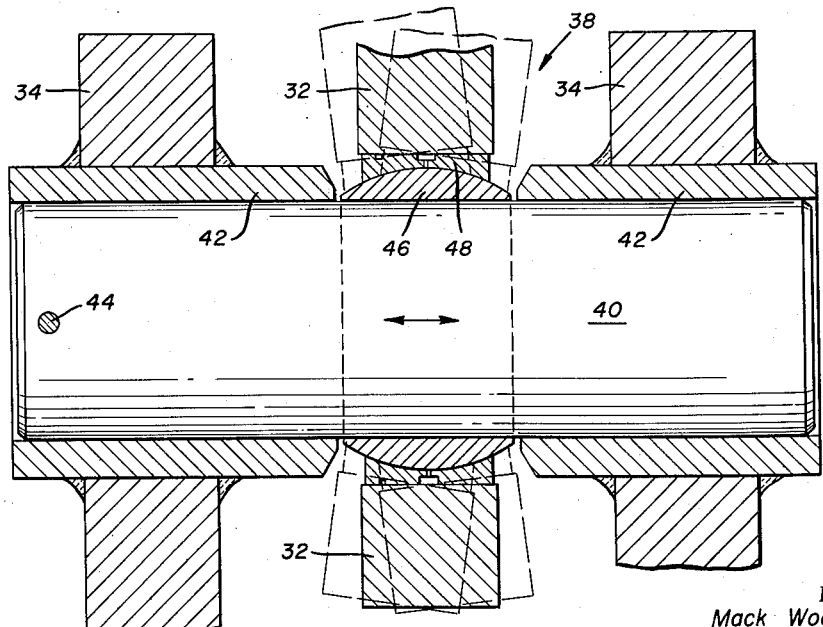
FIGURE 4 is an enlarged fragmentary detail view of a universal bearing construction of the present invention, and is taken substantially on the plane of line 4—4 of FIGURE 3.

The universal bearings 38 are each of similar construction and a description of the one used to connect piston rod 32 to ears 34, as illustrated in FIGURE 4, will suffice for all. As here shown, bearing 38 includes a pin 40 supported in collar members 42, welded to ears 34, and is held in place by a pin 44 which transfixes collar 42 and pin 40. Journaled for axial movement on pin 40 is an inner ring or race 46 having a spherical outer periphery and an axial length somewhat shorter than the space between confronting ends of the collars 42. Surrounding the inner race 46 is a mating outer race 48 having a press fitted in the end of piston rod 32 and formed with a spherical inner periphery slidable on the inner race to form a ball and socket joint. The inner and outer race components are well known in the art.

As may be seen in FIGURES 3 and 4, the relative movement of the tractor body sections 12 and 14 will cause a cocking action of the transverse member 28, as illustrated by the dot-dash lines and the arrows 50, and a corresponding cocking of the tool mount. The effect of such cocking may be observed in FIGURE 4 wherein the dotted lines indicate the limits within which the piston rod 32 may move relative to the tool mount without affecting the self aligning character of the bearing 38. As the rear end of the left side body section 12 rises relative to the other side, as indicated by dot-dash lines in FIGURE 3, the upper end will swing slightly forwardly and the rear end will swing rearwardly causing the bracket 6 carried thereon to assume a similar posture. This will tend to cause a racking of the member 28 and the tool beam arms 24 and 26. Again the ball and socket construction of bearings 38 will accommodate the motion.

Since the brackets 6 and 8 remain equally spaced and parallel as they move up and down relative to each other, the cocking of the tool mount and member 28 connected between them will tend to shorten the lateral spacing between their associated bearings 38. This is also accommodated by journaling the inner races 46 for axial movement on its pin 40 so that the bearing and connected member can move laterally from side to side within the space provided between collars 42.

From the foregoing, it will be seen that the tool beam mount of the present invention neatly solves the problems inherent in attaching a transverse tool beam to a twin crawler tractor and provides a strong and long lived structure which will function efficiently under variegated conditions of use. While the salient features of this invention have been described in detail with respect to a single embodiment, it will, of course, be apparent that certain modifications may be made within the spirit and scope of this invention, and it is not desired therefore to limit the invention to the exact details shown except insofar as defined in the following claims.

I claim:
1. Means for attaching an implement to a twin crawler comprising: a pair of laterally spaced arms; a pair of laterally spaced brackets; universal joints joining one arm and one bracket and a second arm and a second bracket, said brackets having means as a part thereof for securing said brackets to separate body sections of the twin crawler; rigid means bridging the space between said brackets, joining the said brackets and secured thereto, said bridging means having no other means of support, said bridging means and said brackets being secured to one another by means of universal joints, each universal joint including an inner cylindrical pin secured at either end thereof in a direction perpendicular to said arms; an inner race of lesser length than said pin rotatively secured thereabout, said inner race having a spherical outer surface, and an outer race surrounding said inner race and having a spherical inner surface whereby said joints will accommodate rotating, twisting and limited axial motion; power means secured at one end thereof to said bridging means; and a tool beam secured to the ends of said arms at points farthest removed from the universal joints secured thereto and secured to said power means at the other end thereof, the said power means having a universal joint at one end thereof and a pivotal connection at the other end thereof.

2. A self-powered ripper comprising: a twin crawler tractor having two relatively movable body sections; a pair of laterally spaced arms, said arms being secured by means of universal joints at one end thereof each to separate body sections of said twin crawler; rigid means bridging the space between the said twin crawler body sections, each end of said bridging means being secured to one of said movable body sections of the said twin crawler by means of universal joints, said bridging means having no other means of support, each universal joint including an inner cylindrical pin secured at either end thereof in a direction perpendicular to said arms; an inner race of lesser length than said pin rotatively secured thereabout, said inner race having a spherical outer surface, and an outer race surrounding said inner race and having a spherical inner surface whereby said joints will accommodate rotating, twisting and limited axial motion; power means secured at one end thereof to said bridging means; and a tool beam secured to the ends of said arms farthest removed from said universal joints and secured to said power means at the other end thereof, the said power means having a universal joint at one end thereof and a pivotal connection at the other end thereof.

References Cited in the file of this patent
UNITED STATES PATENTS

| | | |
|---|---|---|
| 1,226,528 | Jones | May 15, 1917 |
| 1,430,251 | Parker | Sept. 26, 1922 |
| 1,997,001 | Lamb | Apr. 9, 1935 |
| 2,416,654 | Taylor | Feb. 25, 1947 |
| 2,517,426 | Hall | Aug. 1, 1950 |
| 2,692,148 | Bywater | Oct. 19, 1954 |
| 2,729,469 | Wilson | Jan. 3, 1956 |
| 2,827,717 | Duke et al. | Mar. 25, 1958 |
| 2,868,579 | Panasewicz | Jan. 13, 1959 |
| 2,931,446 | Gwinn | Apr. 5, 1960 |
| 2,942,362 | Panasewicz | June 28, 1960 |